(12) United States Patent
Foisy et al.

(10) Patent No.: US 8,547,664 B1
(45) Date of Patent: Oct. 1, 2013

(54) DISK DRIVE ACTUATOR PIVOT BEARING HAVING AN ADSORPTIVE ELEMENT WITHIN

(71) Applicant: Western Digital Technologies, Inc., Irvine, CA (US)

(72) Inventors: Gregory G. Foisy, Tracy, CA (US); Aaron D. Little, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/709,654

(22) Filed: Dec. 10, 2012

(51) Int. Cl.
*G11B 17/02* (2006.01)

(52) U.S. Cl.
USPC ...................................... 360/265.2

(58) Field of Classification Search
USPC ............... 360/265.2, 264.2, 264, 266, 265.7, 360/265, 265.1, 265.9, 245, 245.9, 264.4, 360/264.3
See application file for complete search history.

(56) References Cited

U.S. PATENT DOCUMENTS

| 5,482,381 | A | | 1/1996 | Krum et al. |
| 6,084,753 | A | * | 7/2000 | Gillis et al. ................... 360/128 |
| 6,280,094 | B1 | | 8/2001 | Gilliland et al. |
| 6,354,743 | B2 | | 3/2002 | Muraki et al. |
| 6,449,120 | B1 | | 9/2002 | Ridenour et al. |
| 6,754,024 | B2 | | 6/2004 | Suk et al. |
| 6,762,909 | B2 | * | 7/2004 | Albrecht et al. ........... 360/99.21 |
| 6,961,214 | B2 | * | 11/2005 | Ameen et al. .............. 360/99.08 |
| 7,160,622 | B2 | | 1/2007 | Okamiya et al. |
| 8,186,976 | B2 | * | 5/2012 | Lund .............................. 417/523 |
| 2002/0158529 | A1 | | 10/2002 | Liu et al. |
| 2004/0021980 | A1 | * | 2/2004 | Albrecht et al. ........... 360/97.02 |
| 2004/0120072 | A1 | * | 6/2004 | Ameen et al. .............. 360/99.08 |
| 2010/0058573 | A1 | | 3/2010 | Sanjay et al. |
| 2011/0027110 | A1 | * | 2/2011 | Verichev et al. ........... 417/410.1 |
| 2011/0188796 | A1 | | 8/2011 | Tsuchiya |
| 2012/0317831 | A1 | * | 12/2012 | Heidecker ...................... 34/427 |

* cited by examiner

*Primary Examiner* — Allen T Cao

(57) ABSTRACT

An actuator pivot bearing is disposed at least partially within a pivot bearing bore of a disk drive actuator. The actuator pivot bearing includes a fixed inner bearing shaft having a lower portion that is attached to the disk drive base. It may also have a rotatable outer bearing sleeve that is attached to the actuator body. The actuator pivot bearing also includes an adsorptive element (e.g. comprising activated carbon, silica gel, zeolites) disposed between the fixed inner bearing shaft and an inner surface of the pivot bearing bore. In certain embodiments, the adsorptive element may optionally be disposed within an actuator pivot bearing internal cartridge space. A restricted clearance between the rotating and fixed bearing components may partially block a diffusion path from the pivot bearing lubricant to the read head. The adsorptive element may be disposed adjacent that restricted clearance.

24 Claims, 4 Drawing Sheets

US 8,547,664 B1

DISK DRIVE ACTUATOR PIVOT BEARING HAVING AN ADSORPTIVE ELEMENT WITHIN

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media. The HGA typically also includes a suspension assembly that includes a mounting plate, a load beam, and a laminated flexure to carry the electrical signals to and from the read head. The read head is typically bonded to a tongue feature of the laminated flexure.

The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding). The angular position of the HSA, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

The rotary actuator of the HSA is pivotally attached to a base of the disk drive, for example by an actuator pivot bearing cartridge that allows the HSA to pivot. The relative position of other disk drive components limits such pivoting to a limited angular range. The actuator pivot bearing cartridge typically includes a lubricant such as grease. Molecules of the lubricant may undesirably outgas or otherwise migrate from the actuator pivot bearing cartridge to the surface of other components within the disk drive, such as the head or disk. Such lubricant migration or outgas sing can thereby act as a contaminant elsewhere in the disk drive, reducing the reliability and/or lifetime of the disk drive and threating the data stored within. Hence, there is a need in the art for a disk drive actuator pivot bearing that can reduce the outgassing and/or migration of an internal lubricant.

DETAILED DESCRIPTION OF EXEMPLARY EMBODIMENTS

Figure 1:
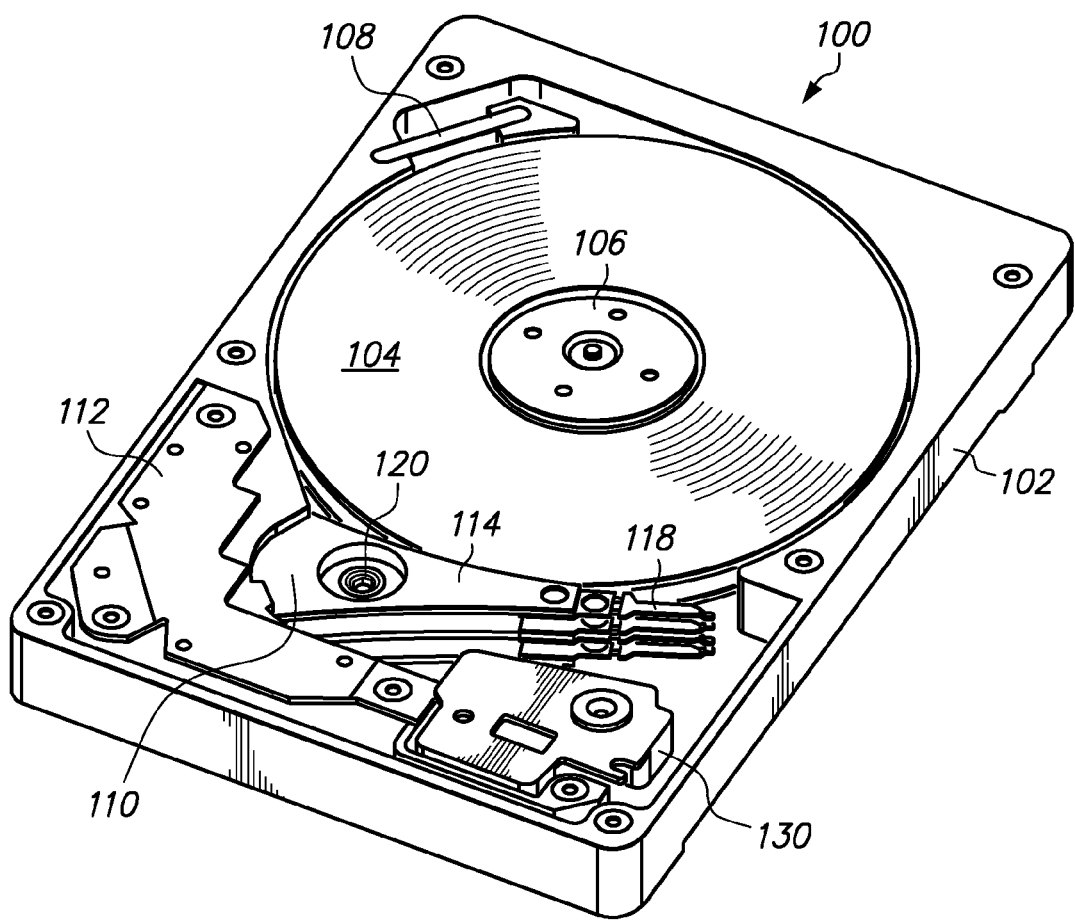
FIG. 1 is top perspective view of a disk drive capable of including an embodiment of the present invention, with the disk drive cover removed to enable viewing of internal components.

FIG. 1 is top perspective view of a disk drive 100 capable of including an embodiment of the present invention, with the disk drive cover removed to enable viewing of certain internal disk drive components. The disk drive 100 includes a disk drive base 102. The disk drive 100 further includes a spindle 106, rotably mounted on the disk drive base 102, for rotating at least one disk 104 that is mounted on the spindle 106. In certain embodiments, disk drive 100 may have only a single disk 104, or alternatively, two or more disks. The rotation of the disk(s) 104 establishes air flow through an optional recirculation filter 108. The disk drive 100 may optionally also include an adsorbant filter 130 for helping to remove contaminants from the internal atmosphere within the disk drive, if and after such contaminants have entered the internal atmosphere within the disk drive.

In the embodiment of FIG. 1, the disk drive 100 further includes a head stack assembly 110 that is pivotably mounted on disk drive base 102 by an actuator pivot bearing 120. The head stack assembly 110 includes a plurality of actuator arms (e.g. actuator arm 114), each supporting a head gimbal assembly (e.g. HGA 118). For example, the HGA 118 may be attached to a distal end of the actuator arm 114 by the well-known conventional attachment process known as swaging. Preferably the disk drive 100 will include one HGA 118 per disk surface, but depopulated disk drives are also contemplated in which fewer HGAs are used. In FIG. 1, the HGAs 118 is shown demerged from the disk 104, so that the disks do not obscure the HGAs from view. In such position, the HGAs would be supported by a conventional head loading ramp (not shown in FIG. 1 so that the view of the HGAs will not be obstructed).

The distal end of the HGA 118 includes a conventional read head (too small to be seen in the view of FIG. 1) for reading and writing data from and to a magnetic disk (e.g. disk 104). The read head may optionally include a ceramic slider substrate and a read/write transducer that may be an inductive magnetic write transducer merged with a magneto-resistive read transducer (e.g. a tunneling magneto-resistive read transducer). Note: Any head that includes a read transducer is referred to as a "read head" herein, even if the head also includes other structures for performing other functions (e.g. writer, microactuator, heater, lapping guide, etc). Note also that in certain optical disk drives, it is possible for a read head to include an objective lens rather than a read transducer.

Also in the embodiment of FIG. 1, a magnet 112 may provide a magnetic field for a voice coil motor to pivot the head stack assembly 110 about the actuator pivot bearing 120 through a limited angular range, so that the read head of HGA 118 may be desirably positioned relative to one or more tracks of information on the disk 104.

Figure 2:
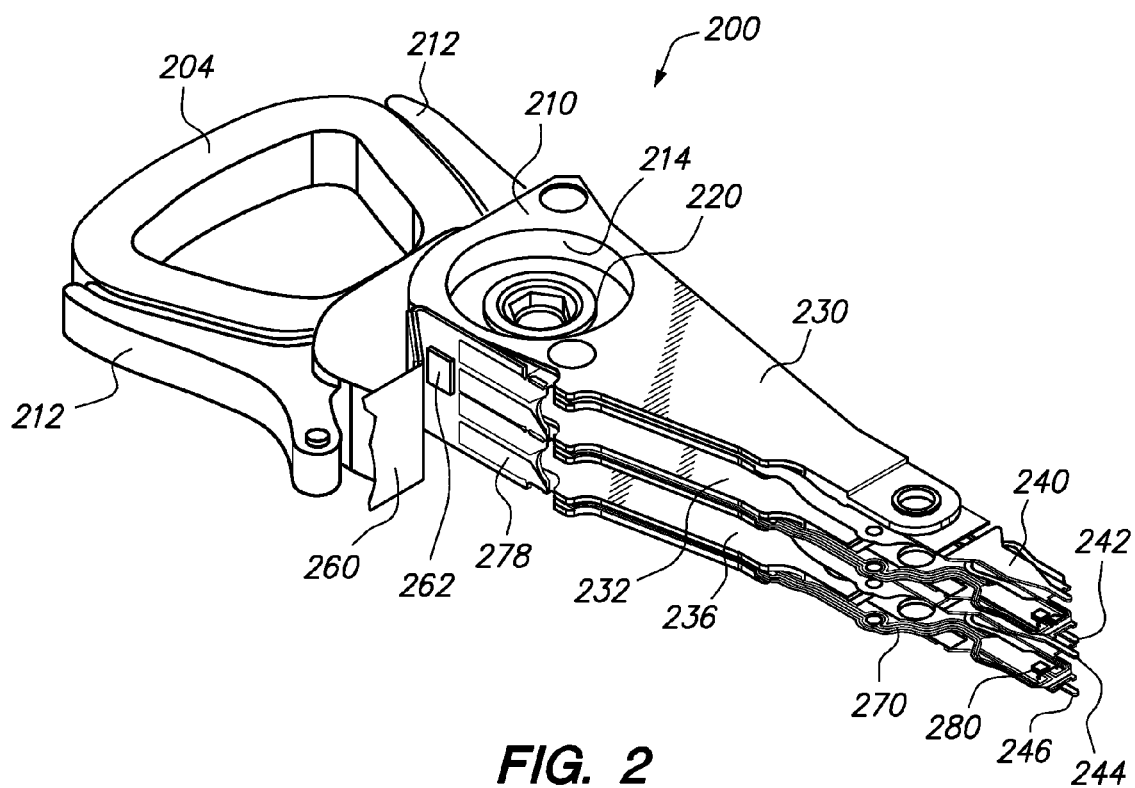
FIG. 2 is a top perspective view of a head stack assembly capable of including an embodiment of the present invention.

FIG. 2 is a top perspective view of a head stack assembly 200 capable of including an embodiment of the present invention. The head stack assembly 200 includes an actuator body 210. In the embodiment of FIG. 2, actuator arms 230, 232, 236 extend from the actuator body 210 in a first direction, while a voice coil support 212 and a voice coil 204 extend from the actuator body 210 in a second direction that is approximately opposite the first direction. An electrical current driven through the voice coil 204 may interact with a magnetic field from a permanent magnet within the disk drive (e.g. magnet 112 of FIG. 1), to create a torque to pivot and control the angular position of the head stack assembly 200.

In the embodiment of FIG. 2, the actuator arms 230, 232, 236 support head gimbal assemblies (HGAs) 240, 242, 244, 246. Specifically, the actuator arm 230 supports the HGA 240, the actuator arm 232 supports the HGAs 242 and 244, and the actuator arm 236 supports the HGA 246. In the embodiment of FIG. 2, each of the HGAs 240, 242, 244, and 246, in turn, supports a read head. For example, the HGA 246 includes a flexure 270 that supports a read head 280 and that includes conductive traces to facilitate electrical connection to the read head 280. A terminal region 278 of the flexure 270 may be electrically connected to a flex cable 260, which runs to an external connector, and upon which a pre-amplifier chip 262 may optionally be mounted.

In the embodiment of FIG. 2, the actuator body 210 includes a bore 214 therein, and an actuator pivot bearing 220 disposed at least partially within the bore 214. As will be described in more detail later in this specification, the actuator pivot bearing 220 may include an inner shaft that is fixed to the disk drive base (e.g. disk drive base 102 of FIG. 1), and a rotatable outer portion that may be attached to the actuator body 210. For example, in certain embodiments, the actuator pivot bearing 220 may include a rotatable outer sleeve that is press-fit into the bore 214 of the actuator body 210, and/or held in place within the bore 214 of the actuator body 210 by a conventional tolerance ring. Alternatively, the actuator pivot bearing 220 may be held within the bore 214 of the actuator body 210 by a conventional C-clip. Alternatively, the actuator pivot bearing 220 may instead have rotatable outer bearing races that are directly bonded to an inner surface of the bore 214 in the actuator body 210, for example, by a conventional adhesive.

Figure 3:
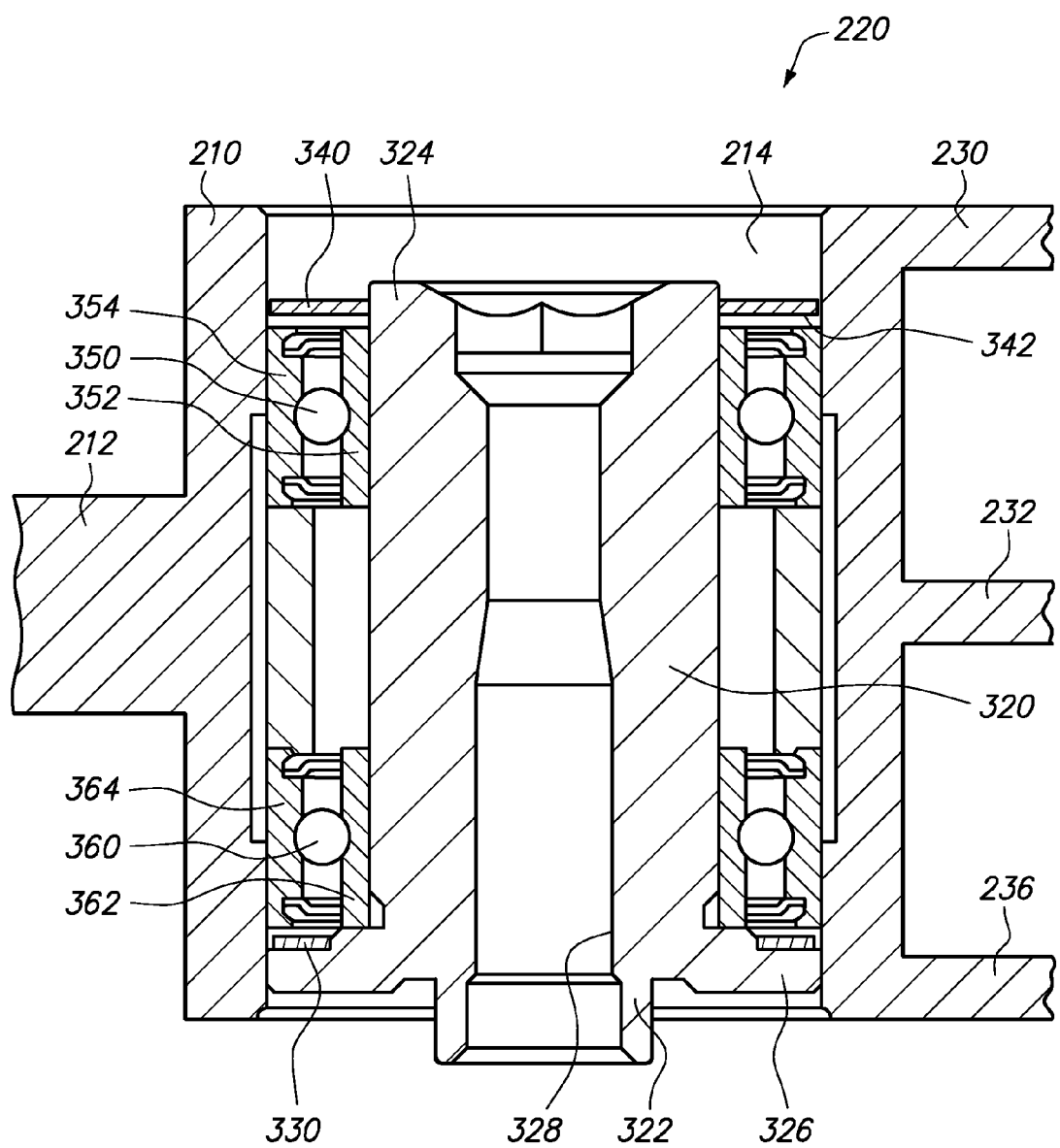
FIG. 3 is a cross-sectional view of a pivot bearing, according to an example embodiment of the present invention.

FIG. 3 is a cross-sectional view of the pivot bearing 220, according to an example embodiment of the present invention. The actuator pivot bearing 220 is disposed within the bore 214 in the actuator body 210. In the embodiment of FIG. 3, the actuator pivot bearing 220 includes a fixed inner bearing shaft 320 having a lower portion 322 that is conventionally attached to the disk drive base (e.g. to the disk drive base 102 of FIG. 1). For example, the lower portion 322 may include a conventional fastener feature 328 (e.g. a conventional threaded recession or projection to accommodate screw fastening to the disk drive base). The lower portion 322 of the fixed inner bearing shaft 320 may also include a radially protruding flange 326, which optionally may provide a function described subsequently herein.

In the embodiment of FIG. 3, the actuator pivot bearing 220 also includes an upper ball bearing 350 and a lower ball bearing 360. The upper ball bearing 350 includes an upper inner race 352 and an upper outer race 354, and is lubricated by a conventional lubricant (e.g. oil and/or grease). Likewise, the lower ball bearing 360 is also lubricated by a conventional lubricant, and includes a lower inner race 362 and a lower outer race 364. The inner races 352, 362 are fixed with the fixed inner bearing shaft 320, and the outer bearing races 354, 364 rotate with the actuator body 210.

In the embodiment of FIG. 3, the actuator pivot bearing 220 also includes an adsorptive element 330 disposed between the fixed inner bearing shaft 320 and an inner surface of the pivot bearing bore 214. The adsorptive element 330 preferably includes an adsorptive material such as silica gel, for example, or various other adsorbant materials such as activated carbon, zeolites, activated alumina, sodium carbonate, calcium carbonate, potassium carbonate, sodium hydroxide, calcium hydroxide, calcium sulfate, and/or a powdered metal.

In the embodiment of FIG. 3, the adsorptive element 330 is optionally disposed on an upper surface of the radially protruding flange 326 of the fixed inner bearing shaft 320, which faces the lubricant in the upper and lower ball bearings 350, 360. In certain alternative embodiments, the adsorptive element may be disposed on an inner surface of a rotatable outer bearing sleeve adjacent an outer periphery of the radially protruding flange 326 (if the pivot bearing has a rotatable outer bearing sleeve, as does the embodiment of FIG. 4).

In the embodiment of FIG. 3, a restricted clearance between the radially protruding flange 326 of the fixed inner bearing shaft 320 and the inner surface of the pivot bearing bore 214 partially blocks a diffusion path from the lubricant to sensitive internal disk drive components such as the read head(s) and/or disk(s). Note that in the embodiment of FIG. 3, the adsorptive element 330 is disposed adjacent that restricted clearance. Such positioning of the adsorptive element 330 may advantageously reduce outgas sing and/or migration of lubricant from the upper and lower ball bearings 350, 360. Note that in certain alternative embodiments, the restricted clearance may instead be defined between the radially protruding flange 326 of the fixed inner bearing shaft 320 and a rotatable outer sleeve of the pivot bearing (if the pivot bearing has a rotatable outer bearing sleeve, as does the embodiment of FIG. 4).

In the embodiment of FIG. 3, the fixed inner bearing shaft 320 also has an upper portion 324 to which a bearing cap 340 may be attached. A restricted clearance between an outer periphery of the bearing cap 340 and inner surface of the pivot bearing bore 214 partially blocks a diffusion path from the lubricant to sensitive internal disk drive components such as the read head(s) and/or disk(s). In certain embodiments, an annular adsorptive element may be disposed on an underside 342 of the bearing cap 340 (facing the lubricant in the upper and lower ball bearings 350, 360). Such adsorptive element positioning may advantageously reduce outgassing and/or migration of lubricant from the upper and lower ball bearings 350, 360.

Figure 4:
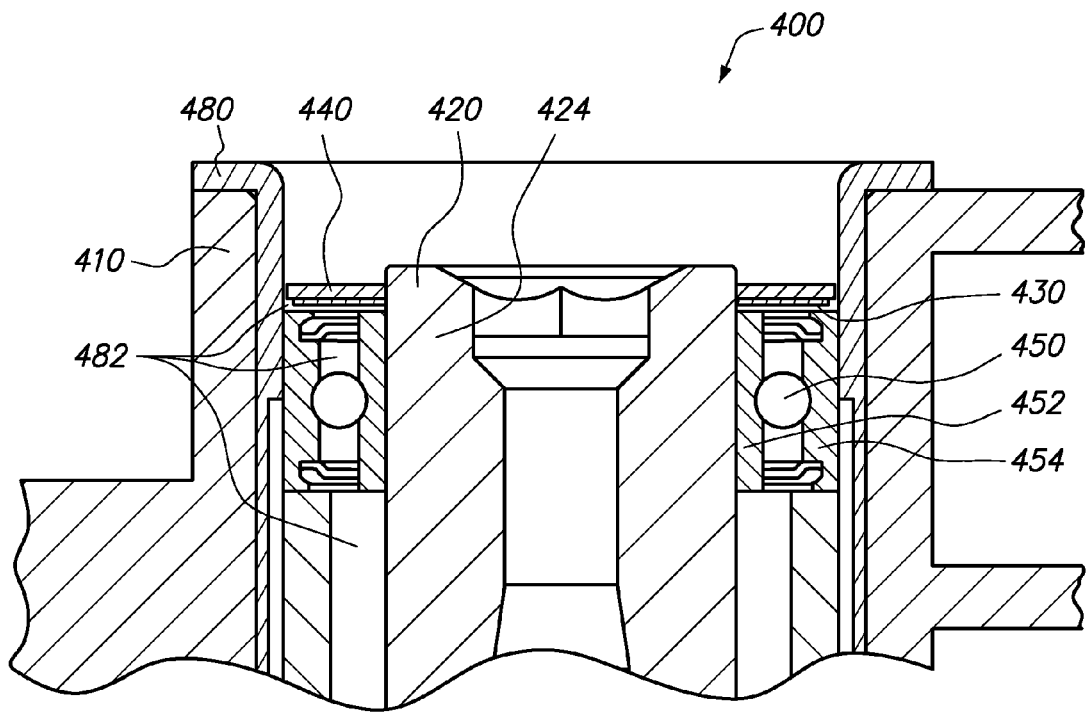
FIG. 4 is a cross-sectional view of the upper portion of a pivot bearing, according to another example embodiment of the present invention.

FIG. 4 is a cross-sectional view of the upper portion of a pivot bearing 400, according to another example embodiment of the present invention. The actuator pivot bearing 400 is disposed at least partially within a bore in an actuator body 410. In the embodiment of FIG. 4, the actuator pivot bearing 400 includes a fixed inner bearing shaft 420 having an upper portion 424 to which a bearing cap 440 is attached. In the embodiment of FIG. 4, the actuator pivot bearing 400 includes an upper ball bearing 450. The upper ball bearing 450 includes an upper inner race 452 and an upper outer race 454, and is lubricated by a conventional lubricant (e.g. oil and/or grease). The inner race 452 is fixed with the fixed inner bearing shaft 420, and the outer bearing race 454 rotates with the actuator body 410.

In the embodiment of FIG. 4, the actuator pivot bearing 400 also includes a rotatable outer bearing sleeve 480 attached to the rotatable upper outer bearing race 454 and to the actuator body 410, so that the actuator pivot bearing 400 may be considered to be an actuator pivot bearing "cartridge." The actuator pivot bearing cartridge 400 has an internal cartridge space 482 that is bounded by the rotatable outer bearing sleeve 480, the bearing cap 440, and the fixed inner bearing shaft 420. The conventional lubricant in the upper ball bearing 450 is therefore disposed in the internal cartridge space 482, between the rotatable outer bearing sleeve 480 and the fixed inner bearing shaft 420.

In the embodiment of FIG. 4, the actuator pivot bearing 400 also includes an adsorptive element 430 disposed on an underside of the bearing cap 440 (the side that faces the conventional lubricant in the upper ball bearing 450). Hence, the adsorptive element 430 is disposed within the internal cartridge space 482, between the fixed inner bearing shaft 420 and the rotatable outer bearing sleeve 480. For example, the adsorptive element 430 may be an annular adsorptive element that preferably includes an adsorptive material such as silica gel, for example, or various other adsorbant materials such as activated carbon, zeolites, activated alumina, sodium carbonate, calcium carbonate, potassium carbonate, sodium hydroxide, calcium hydroxide, calcium sulfate, and/or a powdered metal.

In certain embodiments, the adsorptive element 430 preferably comprises a deposited layer of activated carbon having a thickness in the range 0.2 mm to 2 mm. In certain other embodiments, the adsorptive element 430 preferably includes a permeable substrate (for example, a fabric or a paper optionally cut into an annular shape) that contains the adsorptive material and that is adhered within the actuator pivot bearing. In this context, "contains" may mean impregnated with, or that the fabric encloses the adsorptive material (e.g. activated carbon). For example, a polytetrafluoroethylene (PTFE) filter fabric may wrap activated carbon particles without being impregnated by them.

In the embodiment of FIG. 4, a restricted clearance between an outer periphery of the bearing cap 440 and the rotatable outer bearing sleeve 480 partially blocks a diffusion path from the lubricant to sensitive internal disk drive components such as the read head(s) and/or disk(s). Note that the adsorptive element 430 is disposed adjacent that restricted clearance, in the embodiment of FIG. 4. Such positioning of the adsorptive element 430 may advantageously reduce outgas sing and/or migration of lubricant from the internal cartridge space 482.

Figure 5:
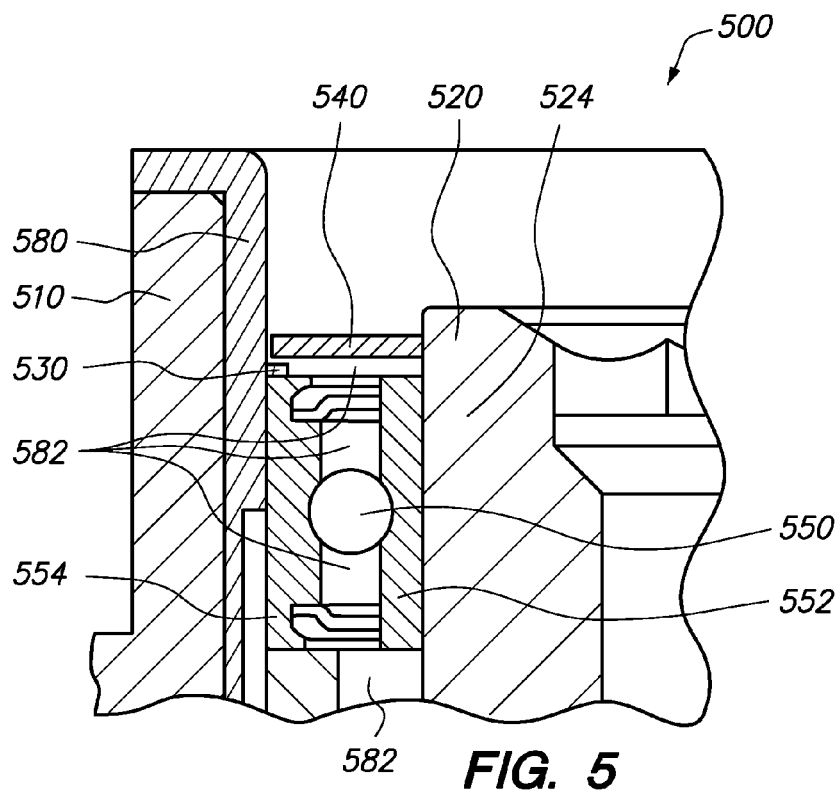
FIG. 5 is a cross-sectional view of the upper portion of a pivot bearing, according to another example embodiment of the present invention.

FIG. 5 is a cross-sectional view of the upper portion of a pivot bearing 500, according to another example embodiment of the present invention. The actuator pivot bearing 500 is disposed at least partially within a bore in an actuator body 510. In the embodiment of FIG. 5, the actuator pivot bearing 500 includes a fixed inner bearing shaft 520 having an upper portion 524 to which a bearing cap 540 is attached. In the embodiment of FIG. 5, the actuator pivot bearing 500 includes an upper ball bearing 550. The upper ball bearing 550 includes an upper inner race 552 and an upper outer race 554, and is lubricated by a conventional lubricant (e.g. oil and/or grease). The inner race 552 is fixed with the fixed inner bearing shaft 520, and the outer bearing race 554 rotates with the actuator body 510.

In the embodiment of FIG. 5, the actuator pivot bearing 500 also includes a rotatable outer bearing sleeve 580 attached to the rotatable upper outer bearing race 554 and to the actuator body 510, so that the actuator pivot bearing 500 may be considered to be an actuator pivot bearing "cartridge." The actuator pivot bearing cartridge 500 has an internal cartridge space 582 that is bounded by the rotatable outer bearing sleeve 580, the bearing cap 540, and the fixed inner bearing shaft 520. The conventional lubricant in the upper ball bearing 550 is therefore disposed in the internal cartridge space 582, between the rotatable outer bearing sleeve 580 and the fixed inner bearing shaft 520.

In the embodiment of FIG. 5, the actuator pivot bearing 500 also includes an adsorptive element 530 disposed on an inner surface of the rotatable outer bearing sleeve 580 adjacent the outer periphery of the bearing cap 540. Hence, the adsorptive element 530 is disposed within the internal cartridge space 582, between the fixed inner bearing shaft 520 and the rotatable outer bearing sleeve 580. For example, the adsorptive element 530 may be an annular adsorptive element that preferably includes an adsorptive material such as silica gel, for example, or various other adsorbant materials such as activated carbon, zeolites, activated alumina, sodium carbonate, calcium carbonate, potassium carbonate, sodium hydroxide, calcium hydroxide, calcium sulfate, and/or a powdered metal. In certain embodiments, the adsorptive element 530 preferably includes a permeable substrate (for example, a fabric or a paper) that contains the adsorptive material and that is adhered within the actuator pivot bearing.

In the embodiment of FIG. 5, a restricted clearance between an outer periphery of the bearing cap 540 and the rotatable outer bearing sleeve 580 partially blocks a diffusion path from the lubricant to sensitive internal disk drive components such as the read head(s) and/or disk(s). Note that the adsorptive element 530 is disposed adjacent that restricted clearance, in the embodiment of FIG. 5. Such positioning of the adsorptive element 530 may advantageously reduce outgas sing and/or migration of lubricant from the internal cartridge space 582.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
    a disk drive base;
    a spindle rotably mounted on the disk drive base;
    a disk attached to the spindle;
    an actuator body including a pivot bearing bore and an actuator arm;
    a read head attached to the actuator arm and disposed adjacent a surface of the disk; and
    an actuator pivot bearing disposed at least partially within the pivot bearing bore, the actuator pivot bearing including
        a fixed inner bearing shaft having a lower portion that is attached to the disk drive base;
        a rotatable outer bearing race that rotates with the actuator body;
        a lubricant; and
        an adsorptive element comprising an adsorptive material selected from the group consisting of activated carbon, silica gel, and zeolites, the adsorptive element being disposed between the fixed inner bearing shaft and an inner surface of the pivot bearing bore.

2. The disk drive of claim 1 wherein actuator pivot bearing is an actuator pivot bearing cartridge that further comprises a rotatable outer bearing sleeve attached to the rotatable outer bearing race and to the actuator body, the actuator pivot bearing cartridge having an internal cartridge space that is bounded by the rotatable outer bearing sleeve, and wherein the adsorptive element is disposed within the internal cartridge space.

3. The disk drive of claim 1 wherein a restricted clearance between the fixed inner bearing shaft and the inner surface of the pivot bearing bore partially blocks a diffusion path from the lubricant to the read head, and wherein the adsorptive element is disposed adjacent the restricted clearance.

4. The disk drive of claim 2 wherein a restricted clearance between the rotatable outer bearing sleeve and the fixed inner bearing shaft partially blocks a diffusion path from the lubricant to the read head, and wherein the adsorptive element is disposed adjacent the restricted clearance.

5. The disk drive of claim 1 wherein the actuator pivot bearing further comprises a bearing cap attached to an upper portion of the fixed inner bearing shaft, and wherein a restricted clearance between an outer periphery of the bearing cap and the inner surface of the pivot bearing bore partially blocks a diffusion path from the lubricant to the read head, and wherein the adsorptive element is an annular adsorptive element that is disposed on an underside of the bearing cap that faces the lubricant.

6. The disk drive of claim 2 wherein the actuator pivot bearing further comprises a bearing cap attached to an upper portion of the fixed inner bearing shaft, and wherein a restricted clearance between an outer periphery of the bearing cap and the rotatable outer bearing sleeve partially blocks a diffusion path from the lubricant to the read head, and wherein the adsorptive element is an annular adsorptive element that is disposed on an underside of the bearing cap that faces the lubricant.

7. The disk drive of claim 1 wherein the annular adsorptive element comprises a deposited layer of activated carbon having a thickness in the range 0.2 mm to 2 mm.

8. The disk drive of claim 1 wherein the annular adsorptive element comprises a permeable substrate that contains the adsorptive material and that is adhered within the actuator pivot bearing.

9. The disk drive of claim 3 wherein the restricted clearance is defined between an outer periphery of the lower portion of the fixed inner bearing shaft and the inner surface of the pivot bearing bore, and wherein the adsorptive element is an annular adsorptive element that is disposed on the lower portion of the fixed inner bearing shaft.

10. The disk drive of claim 4 wherein the restricted clearance is defined between an outer periphery of the lower portion of the fixed inner bearing shaft and the rotatable outer bearing sleeve, and wherein the adsorptive element is an annular adsorptive element that is disposed on the lower portion of the fixed inner bearing shaft.

11. The disk drive of claim 2 wherein the actuator pivot bearing further comprises a bearing cap attached to an upper portion of the fixed inner bearing shaft, and wherein a restricted clearance between an outer periphery of the bearing cap and the rotatable outer bearing sleeve partially blocks a diffusion path from the lubricant to the read head, and wherein the adsorptive element is an annular adsorptive element that is disposed on an inner surface of the rotatable outer bearing sleeve adjacent the outer periphery of the bearing cap.

12. The disk drive of claim 4 wherein the adsorptive element is an annular adsorptive element that is disposed on an inner surface of the rotatable outer bearing sleeve adjacent an outer periphery of the lower portion of the fixed inner bearing shaft.

13. A head stack assembly (HSA) comprising:
an actuator body including a pivot bearing bore and an actuator arm;
a read head attached to a distal end of the actuator arm; and
an actuator pivot bearing disposed at least partially within the pivot bearing bore, the actuator pivot bearing including
a fixed inner bearing shaft having a lower portion that includes a fastener feature;
a rotatable outer bearing race that rotates with the actuator body;
a lubricant; and
an adsorptive element comprising an adsorptive material selected from the group consisting of activated carbon, silica gel, and zeolites, the adsorptive element being disposed between the fixed inner bearing shaft and an inner surface of the pivot bearing bore.

14. The HSA of claim 13 wherein actuator pivot bearing is an actuator pivot bearing cartridge that further comprises a rotatable outer bearing sleeve attached to the rotatable outer bearing race and to the actuator body, the actuator pivot bearing cartridge having an internal cartridge space that is bounded by the rotatable outer bearing sleeve, and wherein the adsorptive element is disposed within the internal cartridge space.

15. The HSA of claim 13 wherein a restricted clearance between the fixed inner bearing shaft and the inner surface of the pivot bearing bore partially blocks a diffusion path from the lubricant to the read head, and wherein the adsorptive element is disposed adjacent the restricted clearance.

16. The HSA of claim 14 wherein a restricted clearance between the rotatable outer bearing sleeve and the fixed inner bearing shaft partially blocks a diffusion path from the lubricant to the read head, and wherein the adsorptive element is disposed adjacent the restricted clearance.

17. The HSA of claim 13 wherein the actuator pivot bearing further comprises a bearing cap attached to an upper portion of the fixed inner bearing shaft, and wherein a restricted clearance between an outer periphery of the bearing cap and the inner surface of the pivot bearing bore partially blocks a diffusion path from the lubricant to the read head, and wherein the adsorptive element is an annular adsorptive element that is disposed on an underside of the bearing cap that faces the lubricant.

18. The HSA of claim 14 wherein the actuator pivot bearing further comprises a bearing cap attached to an upper portion of the fixed inner bearing shaft, and wherein a restricted clearance between an outer periphery of the bearing cap and the rotatable outer bearing sleeve partially blocks a diffusion path from the lubricant to the read head, and wherein the adsorptive element is an annular adsorptive element that is disposed on an underside of the bearing cap that faces the lubricant.

19. The HSA of claim 13 wherein the annular adsorptive element comprises a deposited layer of activated carbon having a thickness in the range 0.2 mm to 2 mm.

20. The HSA of claim 13 wherein the annular adsorptive element comprises a permeable substrate that contains the adsorptive material and that is adhered within the actuator pivot bearing.

21. The HSA of claim 15 wherein the restricted clearance is defined between an outer periphery of the lower portion of the fixed inner bearing shaft and the inner surface of the pivot bearing bore, and wherein the adsorptive element is an annular adsorptive element that is disposed on the lower portion of the fixed inner bearing shaft.

22. The HSA of claim 16 wherein the restricted clearance is defined between an outer periphery of the lower portion of the fixed inner bearing shaft and the rotatable outer bearing sleeve, and wherein the adsorptive element is an annular adsorptive element that is disposed on the lower portion of the fixed inner bearing shaft.

23. The HSA of claim 14 wherein the actuator pivot bearing further comprises a bearing cap attached to an upper portion of the fixed inner bearing shaft, and wherein a restricted clearance between an outer periphery of the bearing cap and the rotatable outer bearing sleeve partially blocks a diffusion path from the lubricant to the read head, and wherein the adsorptive element is an annular adsorptive element that is disposed on an inner surface of the rotatable outer bearing sleeve adjacent the outer periphery of the bearing cap.

24. The HSA of claim 16 wherein the adsorptive element is an annular adsorptive element that is disposed on an inner surface of the rotatable outer bearing sleeve adjacent an outer periphery of the lower portion of the fixed inner bearing shaft.

\* \* \* \* \*